United States Patent [19]

Braun et al.

[11] Patent Number: 4,591,870

[45] Date of Patent: May 27, 1986

[54] INK JET PRINTING APPARATUS AND METHOD WITH CONDENSATE-WASHING FOR PRINT HEAD

[75] Inventors: Hilarion Braun, Xenia; Mark E. Brown, West Carrollton; Michael J. Piatt, Enon, all of Ohio

[73] Assignee: Eastman Kodak Company, Rochester, N.Y.

[21] Appl. No.: 722,546

[22] Filed: Apr. 12, 1985

[51] Int. Cl.$^4$ .............................................. G01D 15/18

[52] U.S. Cl. ....................................... 346/1.1; 346/75; 346/140 R

[58] Field of Search ........................ 346/1.1, 75, 140 R

[56] References Cited

U.S. PATENT DOCUMENTS 4,245,226 1/1981 Paranjpe et al. ...................... 346/74

*Primary Examiner*—E. A. Goldberg
*Assistant Examiner*—Gerald E. Preston
*Attorney, Agent, or Firm*—John D. Husser

[57] ABSTRACT

A system for cleaning lower print head structure of ink jet printing apparatus effects: (i) a condensation cycle wherein a droplet stream(s) are directed past such print head structure in a solvent condensing mode, (ii) a drying cycle in which air is directed across said print head structure to remove condensed solvent and (ii) a heating cycle wherein the lower print head structure is heated to a temperature obviating condensation of solvent from said stream(s).

19 Claims, 6 Drawing Figures

INK JET PRINTING APPARATUS AND METHOD WITH CONDENSATE-WASHING FOR PRINT HEAD

BACKGROUND OF THE INVENTION

1. Field of the Invention

The present invention relates to ink jet printing apparatus and more specifically to a system (i.e. structural configurations and operational functions) of such apparatus that provides improved self-cleaning of apparatus print head structure.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream from an orifice plate that is in liquid communication with the cavity. Periodic perturbations are imposed on the liquid stream (e.g. vibrations by an electromechanical transducer) to cause the stream to break up into uniformly sized and shaped droplets. A charge plate is located proximate the stream break-off point to impart electrical charge in accord with a print information signal and charged droplets are deflected from their normal trajectory. In one common binary printing apparatus charged droplets are deflected into a catcher assembly and non-charged droplets proceed along their nominal trajectory to the print medium.

The components described above (particularly the orifice plate and charge plate) must be precisely sized and positioned to achieve accurate droplet placement on the print medium. Even after this is achieved, however, significant problems are presented at each operational start-up. For example, any ink residue remaining on the charge plate from previous usage can cause shorting or improper charging of droplets. Such ink residue on the catcher assembly can affect droplet deflection or impede droplet passage to the print medium. Also, it is quite difficult to initiate the continuous droplet stream, in a stable condition along its nominal trajectory, without some initial instabilities that cause wetting of the charge plate.

Prior art solutions to the residue problem have included (i) purging the ink cavity, orifice plate and charge plates with air upon shut-down of an operational cycle; (ii) providing a nearly instantaneous negative pressure at shut-down to avoid the residue on the lower print head and (iii) introduction of cleaning solution at start-up and or shut-down. Prior art solutions to prevent unwanted wetting at start-up have included moving the lower print head charge plate structure away from its operative position at start-up or providing a rapid pressure pulse in the image bar to force an initially straight start for the jets.

These solutions are all helpful but not without related difficulties or disadvantages. For example, purging the ink system with air and/or a cleaning solution adds considerable complexity to the apparatus as well as necessitating a lengthy flushing period at start-up. Moving of the lower print head assembly's charge plate causes great potential for unaccuracy in its re-alignment with the upper print head assembly's orifice plate. The instantaneous start-up approach requires an extremely fast-actuation solenoid valve and rigid conduits and is not completely reliable in constructions where jet-to-electrode clearances are very small. Instant shut-down has similar disadvantages.

U.S. application Ser. No. 722,521, entitled "Ink Jet Printing Apparatus Having a Wet-Storage System", and filed concurrently, in the name of M. Piatt, discloses a highly useful approach for solving the above-noted problems. This approach provides a unique storage and start-up station into which the apparatus print head assembly is transported from the operative printing path. The present invention provides further improvements in the approach described in the aforementioned copending application and in particular provides structure and operational modes which effect enhanced cleaning for the lower portions of the ink jet print head assembly.

SUMMARY OF THE INVENTION

Thus, one general objective of the present invention is to provide, in ink jet apparatus, structural and functional features for improved self-cleaning of the lower portions of the print head assembly. The present invention improves the apparatus reliability and performance, e.g. from the viewpoints of non-shorting and accuracy of drop placement. The invention is also advantageous from the viewpoint of simplicity as it provides a washing liquid for the print head structure without the need for a special cleaning liquid supply, nor the associated plumbing and applicator structures.

The above and other objectives and advantages are accomplished in accordance with the present invention by providing in an ink jet printing apparatus of the type having an upper print head portion which directs ink droplet streams and a lower print head portion which influences droplets as they pass thereby, an improved operational system for cleaning such lower print head portions by: (i) directing ink droplet streams past the lower print head portions, with the relative temperatures of the ink and lower print head portions adjusted to cause condensation of the ink solvent on such portions and (ii) directing high velocity air across the lower print head portions to dry them. After such cleaning sequence(s) the relative temperature of the ink and lower print head portions is adjusted so that such solvent condensation ceases.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
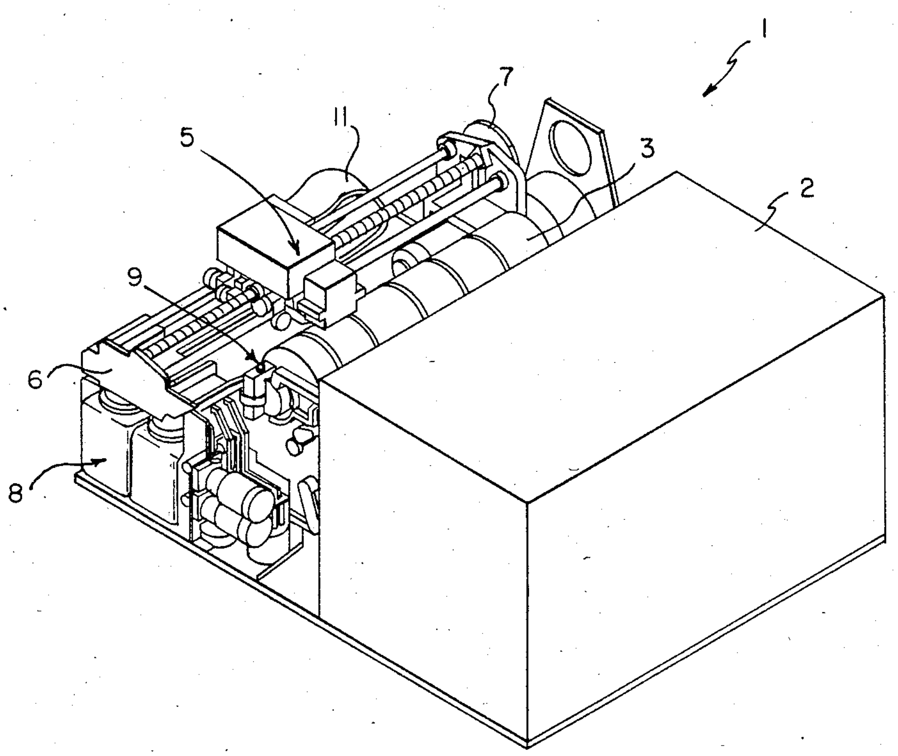
FIG. 1 is a perspective view of one embodiment of ink jet printing apparatus in accord with the present invention.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 2. Ink is supplied to and returned from the print head assembly by means of flexible conduits 11 which are coupled to ink cartridge 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the operative cycle of apparatus 1 as will be described subsequently.

Figure 2:
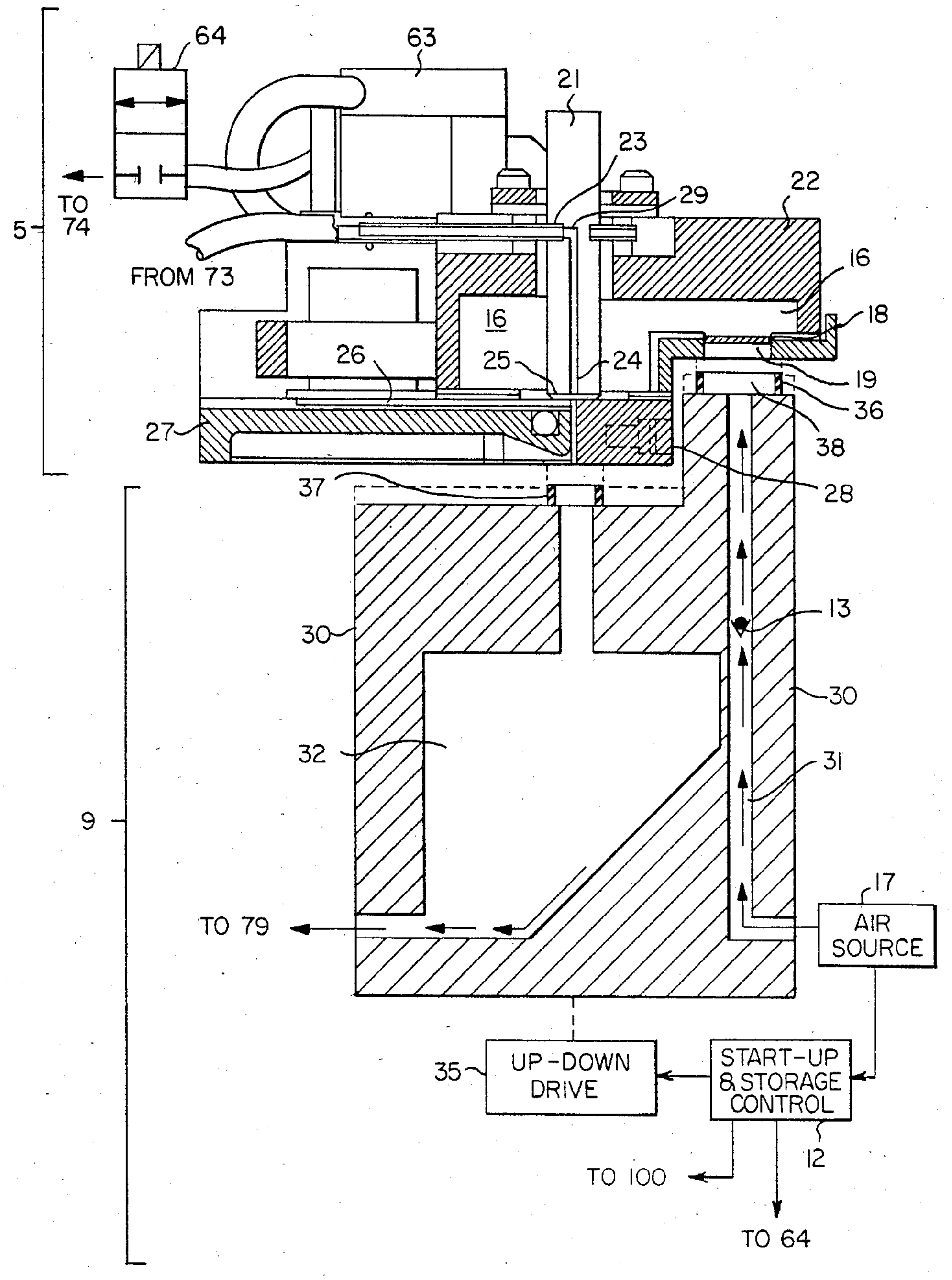
FIG. 2 is a schematic cross-sectional view of a portion of the FIG. 1 apparatus illustrating the upper and lower print head assemblies and their cooperative relation with the storage and start-up station.

Referring briefly to FIG. 2, one embodiment of print head assembly 5 according to the present invention can be seen in more detail. The assembly 5 includes an upper print head portion including a print head body 21 mounted on housing 22 and having an inlet 23 for receiving ink. The body 21 has a passage leading to a print head cavity 24 and an outlet 29 leading from the cavity 24 to an ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now, continuation in part, Ser. No. 777,102 filed Sept 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983, now abandoned, further filed as continuation in part Ser. No. 696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Finally, in accord with the present invention, lower print head assembly includes a predeterminedly configured and located wall member 28 which will be described in more detail subsequently.

The ink supply and circulation system of the FIG. 1 apparatus includes various ink conduits (i.e. lines) which form an ink recirculation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet to a junction between catcher return line 75 and the main ink return line 76. An ink return line 79 also extends from station 9 back to cartridge 8. An air bleed line 78 extends from main filter 61 back to cartridge 8 and an ink bypass line 77 extends from a juncture with line 73 also back to cartridge 8. The FIG. 2 system also includes an ink heater 61, a flow restricter 62, final filter 63, head return valve 64, temperature sensor(s) 65 and pressure sensor 66 whose particular functions will become clear in the subsequent descriptions. As will be clear from the subsequent description, the present invention is not limited to use with the particular ink circulation line arrangement illustrated in FIG. 3.

Figure 3:
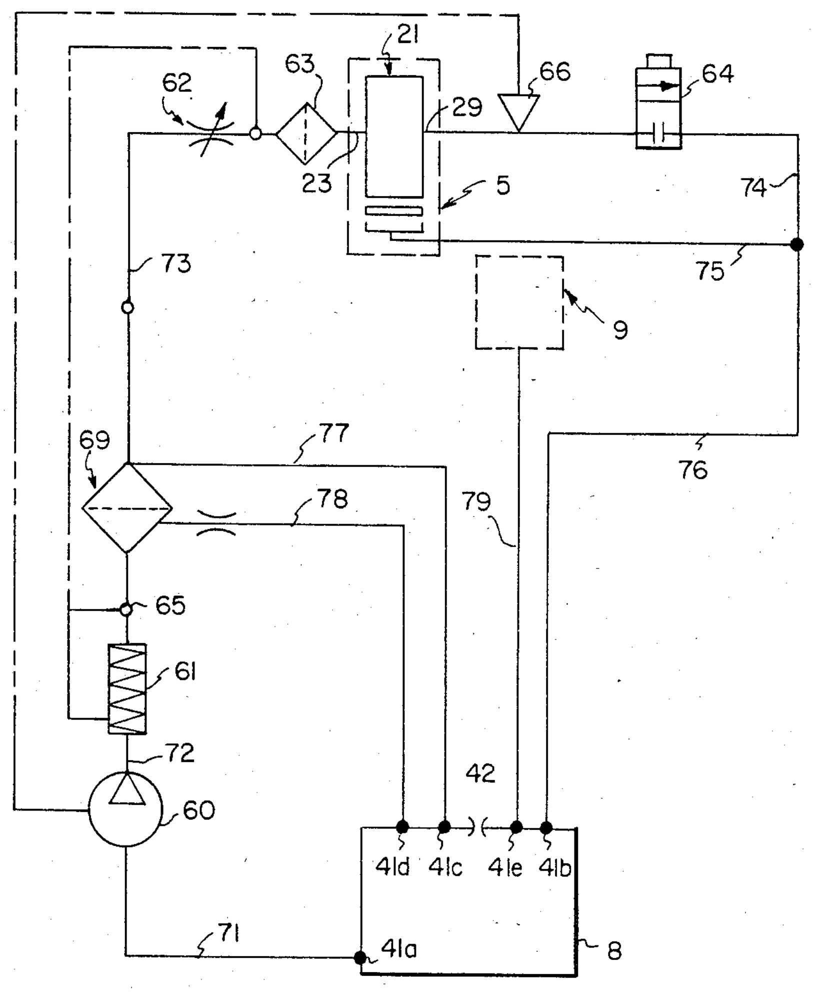
FIG. 3 is a diagrammatic illustration of the ink supply system of the apparatus shown in FIG. 1.

As shown in FIGS. 1 and 3, cartridge 8 can be in a form that is constructed to be readily inserted and removed, as a unit, from operative relation with lines of the ink circulation system. For this purpose suitable couplings **41*a*, 41*b*, 41*c*, 41*d* and 41*e* are formed on the cartridge 8 in a manner so as to operatively connect the lines 71, 76, 77, 78 and 79 upon insertion of the ink cartridge 8 into its mounting in the printer apparatus. Cartridge 8 can have a vent 42 to render the main interior thereof at atmospheric pressure. The cartridge can be constructed with an internal venturi structure which effects return of ink from return line 76** and is disclosed in more detail in concurrently filed U.S. application Ser. No. 722,548, entitled "Ink Supply Cartridge and Cooperative Ink Circulation System of Continuous Ink Jet Printer". However, the present invention can function equally well in a circulation system utilizing a separate vacuum pump to withdraw ink from the return lines back to the cartridge.

Heater 61, under the feedback control of sensor 65, conditions the circulating ink to the proper operating temperature and pressure sensor 66 regulates pump 60 to attain the proper ambient line circulation pressure. When valve 64 is closed, ink passing into the print head 20 issues as ink streams from the orifice plate of the print head. The ink streams will break into droplets either in an uncontrolled manner or in a controlled manner under the influence of a stimulating transducer as subsequently described.

Referring again to FIG. 2, the storage and start-up station 9 of the present invention comprises a housing 30 having an air supply passage 31 and an ink sump cavity 32 formed therein. The housing 30 is located adjacent the printing path of print head assembly so that the print head assembly can be moved to the cooperative position overlying the housing (as shown in FIG. 2) by the translational drive means 7 (FIG. 1). The housing embodiment shown in FIG. 2 is movable between the dotted-line and solid-line positions (toward and away from the print head assembly), e.g. by up-down drive 35; however, various other arrangements to provide the desired interrelations between the storage and start-up station 9 and print head assembly will occur to one skilled in the art.

As shown in FIG. 2, the housing 30 includes sealing means 36 and 37 which are constructed and located to seal the interface regions of the conduit 31 and sump 32 with the print head assembly from the surrounding atmosphere when the housing is in the upper (dotted-line position). The ink sump 32 is aligned to receive ink issuing from the orifice plate and conduct it to return line 76. The conduit 31 is adapted to interfit at neck 38 with a mating recess inlet 18 formed in the print assembly. The air inlet 18 includes an air filter 19, which is adapted to filter air from a pressure source 17 prior to its passage through opening 16 to the orifice and charge plate region of the print head assembly. A ball valve 13 is biased to a normally closed position in air conduit 31 and is actuated to an open position by the pressure of the air from source 17 when the air source is on.

Figure 4:
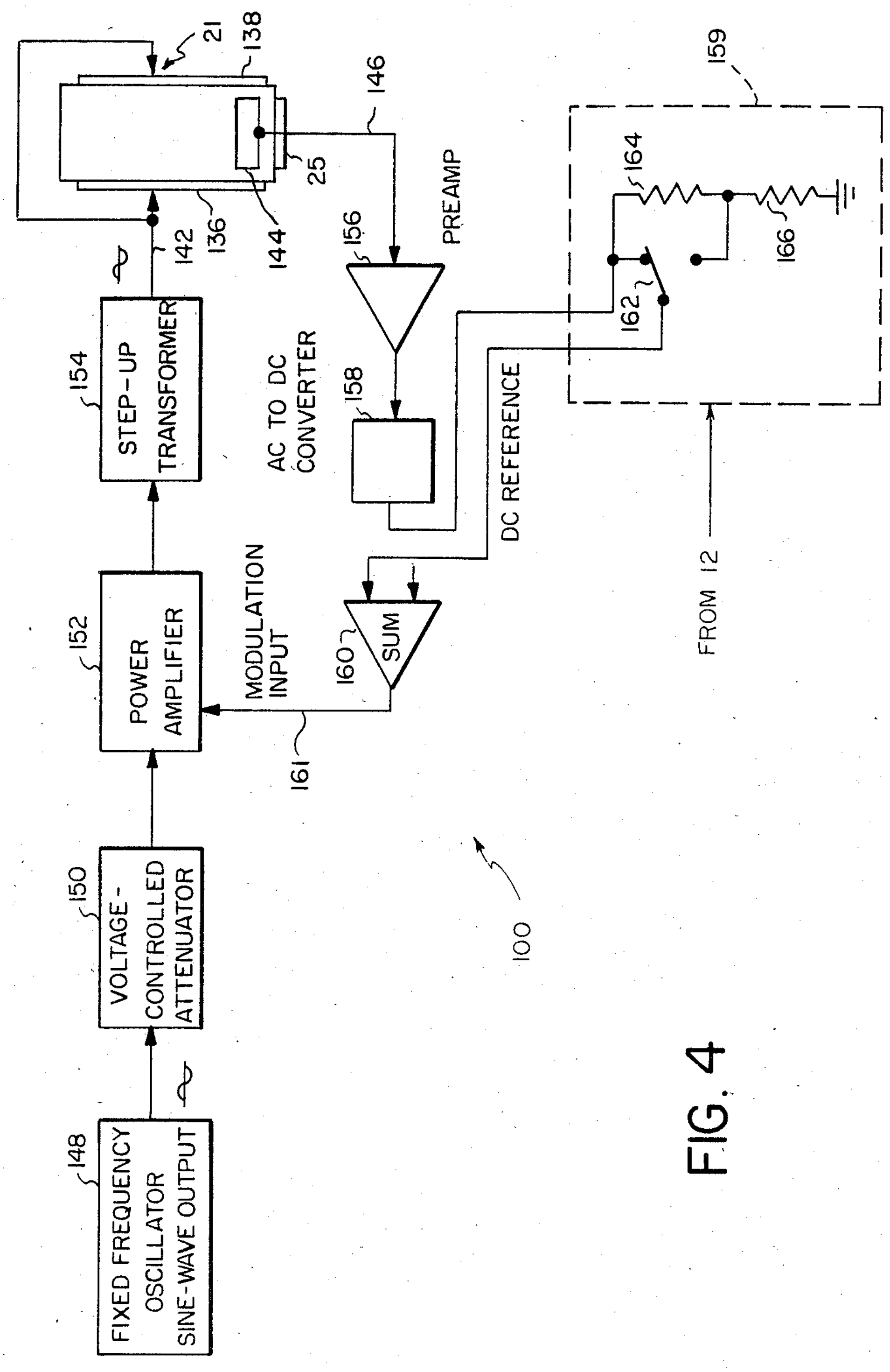
FIG. 4 is a schematic illustration of one vibratory transducer system useful in the FIG. 1 apparatus.

An exemplary embodiment of a transducer system 100 for the print head is shown in FIG. 4. The orifice plate 25 is bonded to print head body 21 which is formed, e.g., of stainless steel, by means of a suitable adhesive. Preferably the conduits attaching to body 21 are selected from among a number of materials, such as a polymeric material, which have a vibrational impedance substantially different from that of the stainless steel body. As a consequence, power loss through the conduits and the resulting damping of the vibrations are minimized.

The body can be supported by mounting flanges which are relatively thin and are integrally formed with the body 21. The flanges extend from opposite sides of the elongated print head body and are substantially equidistant from the first and second ends of the body. As a result, the flanges may be used to support the body in a nodal plane and are therefore not subjected to substantial stress.

Transducer means, including thin piezoelectric transducers 136 and 138, are bonded to the exterior of the body of block 2 and extend a substantial distance along the body in the direction of elongation thereof, from adjacent the support means toward both the first and second ends of the body. The transducers 136 and 138 respond to a sinusoidal electrical drive signal, provided by a power supply on line 142, by changing dimension, thereby causing mechanical vibration of the body and break up of the fluid streams into streams of drops.

The piezoelectric transducers 136 and 138 have electrically conductive coatings on their outer surfaces, that is the surfaces away from the print head block 21, which define a first electrode for each such transducer. The metallic print head block 21 typically are grounded and thus provide the second electrode for each of the transducers. The piezoelectric transducers are selected such that when driven by an a.c. drive signal, they alternately expand and contract in the direction of elongation of the print head. As may be seen in FIG. 4, transducers 136 and 138 are electrically connected in parallel. The transducers are oriented such that a driving signal on line 142 causes them to elongate and contract in unison. Since the transducers 136 and 138 are bonded to the block 21, they cause the block to elongate and contract, as well.

If desired, an additional piezoelectric transducer 144 may be bonded to one of the narrower sides of the print head to act as a feedback means and to provide an electrical feedback signal on line 146 which fluctuates in correspondence with the elongation and contraction of the print head block 21. The amplitude of the signal on line 146 is proportional to the amplitude of the mechanical vibration of the block 21.

The drive means which, in the printing mode applies a drop-stimulating drive signal to the transducer means may also be used to apply a cleaning drive signal, approximating a pulse train, to the transducer means. In the printing mode the output of a fixed frequency oscillator 148, operating at approximately 75 KHz, is supplied to transducers 136 and 138 via a voltage controlled attenuator circuit 150, a power amplifier 152 and a step-up transformer 154. The output from transducer 144 on line 146 is used to control the amount of attenuation provided by circuit 150. The signal on line 146 is amplified by amplifier 156, converted to a d.c. signal by converter 158, and then supplied to circuit 159 which, during printing operation, passes it directly to summing circuit 160. This signal is compared to a selected reference signal by summing circuit 160 to produce a signal on line 161 which controls the attenuation provided by circuit 150. By this feedback arrangement, the amplitude of the drive signal on line 142 and the amplitude of the mechanical vibration of the print head are precisely controlled. Typically, a substantially sinusoidal drive signal of approximately 3 volts rms is applied to the transducers.

When it is desired for the transducer to operate in a cleaning vibrational mode, to be described below, switch 162 is actuated by start-up and storage control 12 into its lower switching position in which circuit 159 attenuates the output from converter 158 by means of voltage divider formed from resistors 164 and 166. As a result of this attenuation, the summing circuit 160 supplies a control signal to attenuator 150 which causes attenuator 150 to permit a much larger amplitude signal to be applied to power amplifier 152. Amplifier 152 is driven into saturation at the extreme levels of its input, thus resulting in a square wave signal approximating a pulse train being applied to transducers 136 and 138. The square wave is of a substantially greater amplitude than the sinusoidal drive signal. Typically the cleaning drive signal fluctuates between plus and minus 9 volts. It will be appreciated that a square wave signal consists of a number of harmonic signals of higher frequencies. This cleaning drive signal therefore has at least some components which are higher in frequency than the substantially sinusoidal drive signal. Further details of the ultrasonic cleaning cycle are set forth in concurrently filed U.S. application Ser. No. 722,543, entitled "Ink Jet Printing Apparatus Having Ultrasonic Print Head Cleaning System".

The structural and functional details of the apparatus thus far described will be further understood by the following description of how it operates in accordance with the present invention, under the control of start-up and storage control 12 (FIG. 2), which can be, e.g., a portion of a microprocessor system that controls the overall operation of apparatus 1. Thus, commencing the operational description in the course of a nominal printing operation sequence, print head assembly 5 is traversing across the print cylinder and ink is flowing in a plurality of stabilized droplet streams from orifice plate 25, under the influence of the drop stimulator operating in its printing mode. Charge is imparted to droplets by charge plate 26 in accordance with a printing information signal and non-charged drops pass to the print medium, while charged drops are deflected into catcher 27. At this stage valve 64 is closed and ink is circulating from the catcher 27 back to cartridge 8 as described with respect to FIG. 3.

When it is desired to change apparatus 1 from a printing or standby condition to a storage condition (e.g. for an overnight period) an appropriate command is transmitted to control 12. In response to this command control 12, signals drive 7 to translate the print head assembly to the position over the storage and start-up station 9 as shown in FIG. 2 (solid lines), with the charge plate operating in a catchall-drops mode. The up-down drive 35 is next actuated to move housing 30 into the dotted-line position shown in FIG. 2, whereby the space surrounding print head assembly's orifice and charge plates and catcher are sealed from the atmosphere. Next, valve 64 is opened so that ink flows mainly through the cavity outlet and only weeps through orifice plate 25. The ink which does pass through the orifice plate is transported and held by capillary forces in the region defined by the operative surfaces of the charge and orifice plates 26 and 25 and the opposing surface of wall means 28. Next the ink supply pump is shut off and it will be appreciated that the operative surfaces of the orifice and charge plate are stored in a wet condition and that the entire fluid system is full of ink rather than air. Also, importantly, the region surrounding operative surfaces of the charge plate orifice plate and catcher are sealed in a high vapor atmosphere so that ink drying is significantly inhibited.

The start-up cycle of apparatus 1, preparatory to recommencing of printing operations, begins with the apparatus in the storage condition just described. Upon receipt of an appropriate start-up command, control 12 actuates pump 60 and heater 61 to circulate and heat ink with valve 64 in an open condition. After the ink has reached proper temperature, valve 64 is closed to an extent that ink is forced through orifice plate 25 in a non-stable condition spraying in all directions and impacting the surfaces of the charge plate 26 and catcher 27. This cleans any dirt that may reside on those surfaces and redissolves any ink which may have dried upon the surfaces.

Following this procedure in the start-up cycle, the valve 64 is once again opened to an extent allowing substantial cross-flow through the ink cavity and so that the streams of ink flow through the orifices of plate 25 cease. The transducer system 100 is now actuated in its ultrasonic cleaning mode by control 12 and the ultrasonic energy is transmitted not only to clean the orifice plate but to the charge plate and portions of the catcher assembly 27. That is, by virtue of the configuration of wall means 28 in relation to the charge plate and orifice plate structures; a liquid ink mass is supported by those cooperative surfaces, assisted by capillary forces, against gravitational forces. The ultrasonic energy imparted to the liquid in the print head cavity and orifice plate is thereby transmitted to the lower print head assembly surfaces (e.g. the charge plate and catcher surfaces) that are in hydraulic communication with the liquid ink mass supported by the cooperation of wall means 28 with those other print head assembly surfaces.

During the next stage of the start-up operations, the valve 64 remains opened to allow the ink to cross-flush through the cavity at a rate that causes only a slight weeping of ink through the orifices of the plate 25 and the air source 17 is actuated to the sealed region surrounding the print head assembly. Thus with the housing 9 in the dotted-line position control 12 provides air through conduit 31, air filter 19 and opening 16 into the region below the orifice plate's exterior surface. In this condition the fluid pressure differential across the orifices of plate 25 is in general equilibrium and can be selectively varied by adjustment of the air control and/or valve 64 to alternately urge ink from the exterior side of the orifices to the cavity side of the orifices and from the cavity side to the exterior side. This reversing flow of ink in the orifices is effective in cleaning the orifices, e.g., lifting particles trapped on the cavity side of the orifice plate into a crossflush flow and out of the ink cavity. If desired, the air pressure on the exterior side of the charge plate can be sufficiently high to introduce filtered air into the ink cavity 24 through the orifices. The pressure differential also can be such as to allow only ink ingestion back into the cavity. This cycle, i.e., alternate weeping and ingestion of ink can be repeated one or more times to achieve good cleaning of the orifice plate and adjacent cavity interior. Further details of this orifice plate cleaning cycle are disclosed in concurrently filed U.S. application Ser. No. 722,543, entitled "Ink Jet Printing Apparatus with Orifice Array Cleaning System".

After this sequence, control 12: (i) raises the pressure ejecting ink from orifice plate 26 to the nominal pressure, e.g. by further closing of valve 65; and (ii) actuates air source 17 to introduce a pressurized air flow through conduit 31, air filter 19 and opening 16 into the region surrounding the orifice and charge plates. The passage formed by the charging surfaces of the charge plate 26 and the upper portion of opposing wall 28 restricts the air flow from source 17 so that the velocity through the passage is high, e.g. ten times that of the ink jet velocity. The high velocity air flow past the charge plate and catcher surface now pushes the residual ink off of the charge plate and catcher surfaces as an entire sheet. It has been found preferable to commence air flow at the same time the seal is removed and ink jets are actuated to their nominal pressure because removing the ink as a sheet gains assistance from the ink viscosity and is more reliable than removing small ink heads (which form if air is not supplied before the ink is running in a non-spray condition). The details of this cycle of operation and of preferred air control structure for providing skiving air flow across the charge plate and catcher surface are described in concurrently filed U.S. application Ser. No. 722,545, entitled "Ink Jet Printing Apparatus Having An Improved Start-Up System", which is incorporated herein by reference for disclosure of one preferred air control structure for practice of the present invention.

After the above-described air flow has continued for a short period, e.g. 5–10 seconds, control 12 deactivates the air flow allowing the ink jet streams to resume a straight flight past the charge plate and catcher assembly surface. We have discovered that in such a functional condition, the locally high humidity environment (caused largely by the ink solvent) and the temperature differential between the surfaces of the charge plate and catcher vis-a-vis the ink causes a rapidly forming condensation of the ink solvent (e.g. water) on the charge plate and catcher surfaces adjacent the ink streams. This fluid, essentially water extracted from the ink jets, is further effective in dissolving residual ink from those surfaces and/or wash and dirt accumulated thereon. It has been found to enhance the condensate formation to allow droplets to break up on a nonstimulated fashion and thus it is preferred that the transducer system not be actuated at this stage. After allowing the condensate to form for 5–10 seconds the air flow is again actuated by control 12 to again dry the lower print head assembly surfaces. If desired this air flow can be from a cool, dehumidified source to enhance evaporation and drying of the lower print head portions.

The above procedure of condensate formation and air drying is preferably performed several times. It is preferred that the jets continue to form from the print head during the condensation/drying cycles, i.e. that condensate removal be effected by air flow with the jets continuing. After the desired number of condensate cleaning cycles, e.g. 5 cycles of the air flow on and off for 4 or 5 second periods, control 12 actuates heating means 90 to raise the temperature of the lower print head assembly portions to an extent that condensation no longer will form on those surfaces when air flow terminates. With the charge plate in a dried condition, the stimulation control transducer system 100 is actuated and the air source 17 is shut off. Drop charging commences in a catchall drops mode. At this stage the print head assembly is in the operating condition in which is was moved into the storage and start-up station and is ready to be moved back along the printing path for printing operation.

Figure 5:
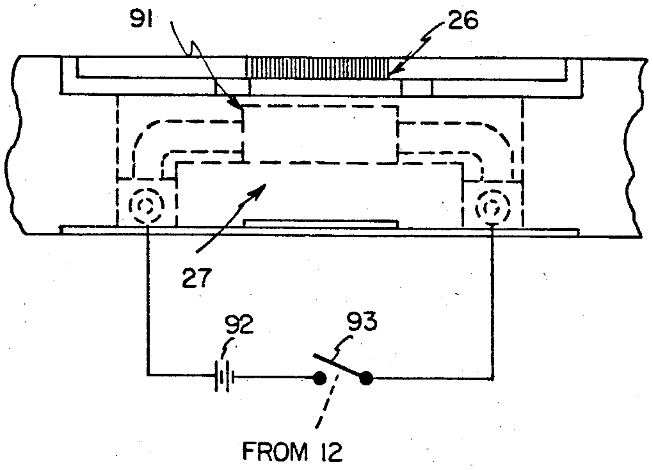
FIGS. 5 and 6 are an enlarged front view and cross-section of a portion of the lower print head assembly of the FIG. 1 apparatus.
Figure 6:
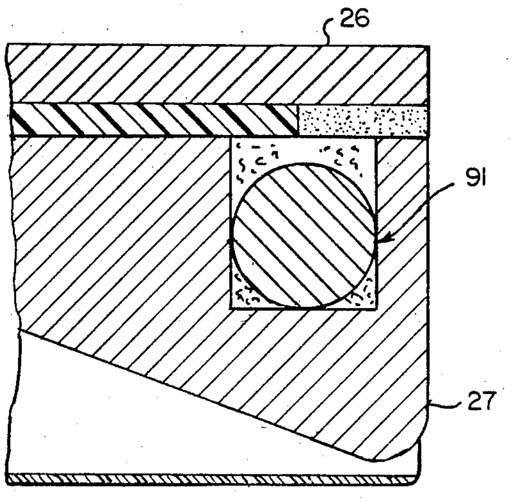

FIGS. 5 and 6 illustrate one heating means useful in accord with the present invention which comprises a resistance heating element 91 embedded in the catcher 27 closely adjacent charge plate 26. A suitable power source 92 for the heater is actuable to a heating mode by switch 93 in response to a signal from controller 12. Alternative structures for providing the desired heating for the charge plate and catcher surfaces are described in U.S. application Ser. No. 722,547, entitled "Print Head Heating for Ink Jet Printer Apparatus" and filed concurrently, in the names of R. Leen and D. Pipkorn, and others will occur to those skilled in the art.

The invention has been described in detail with particular reference to preferred embodiments thereof, but it will be understood that variations and modifications can be effected within the spirit and scope of the invention. For example, it is not required that the ink be heated to achieve a condensate forming relative temperature condition between the lower print head surfaces and the ink mist formed by droplet break-up. Also the cleaning cycles of the present invention can be advantageously employed at other stages of start-up, at shutdown or in periodic cleaning periods between printing sequences. Further, although the present invention has been described as employed in continuous ink jet printing apparatus, those skilled in the art will understand that the concepts of the invention can be employed in other ink jet printing apparatus (e.g. drop on demand printers) to effect cleaning of lower print head structure.

What is claimed is:

1. Ink jet printing apparatus of the type having (i) an upper print head means for generating an ink droplet stream(s) from ink supplied thereto under pressure, (ii) a lower print head means, including a charge plate, for selectively imparting electrical charge to droplets of such stream(s) and (iii) means for supplying pressurized ink flow to said upper print head means, the improvement comprising:

(a) means for heating operative surfaces on said lower print head means;
(b) means for directing a drying air flow across operative surfaces of said lower print head means; and
(c) control means for sequentially:
  (1) actuating a condensation cycle wherein said droplet stream(s) are directed past said lower print head means with said print head means at a solvent condensing temperature;
  (2) actuating a drying cycle wherein high velocity air is directed past said lower print head means; and
  (3) actuating said heating means to raise said lower print means above said condensing temperature.

2. In an ink jet printing apparatus of the type having an upper print head which directs ink droplet streams and a lower print head means for selectively charging such droplets as they pass thereby, an improved operational method for cleaning portions of said lower print head means, said method comprising:

(a) directing such droplet streams past said lower print head means with the relative temperatures of the print head portions and the ink causing substantial condensation of the ink solvent on those print head means; and
(b) after accumulation of such condensate, directing drying air across such lower print head means.

3. The method defined in claim 2 comprising subsequently heating said lower print head means to a temperature which prevents condensation of such ink solvent.

4. The invention defined in claim 2 wherein said ink is heated to effect such condensate forming temperature differential.

5. The invention defined in claim 2 wherein the condensing/drying sequence is repeated a plurality of times.

6. The invention defined in claim 5 wherein the lower print head means are heated after a plurality of condensing/drying sequences.

7. The invention defined in claim 1, 2, 3, 4, 5 or 6 wherein said lower print head means include drop catcher surfaces.

8. The invention defined in claim 1, 2, 3, 4, 5 or 6 wherein said droplet streams are directed in a nonstimulated condition during said condensing sequence.

9. The invention defined in claim 8 wherein control stimulation is applied to said droplet streams after a condensing/drying sequence(s).

10. Ink jet printing apparatus of the type having (i) an upper print head means for generating an ink droplet stream(s) from ink supplied thereto under pressure, (ii) a lower head means, including a charge plate, for selectively imparting electrical charge to droplets of such stream(s) and (iii) means for supplying pressurized ink flow to said upper print head means, the improvement comprising:

(a) first heating means for heating the ink supplied to the upper print head means to a nominal temperature exceeding ambient;
(b) second heating means for heating operative surfaces on said lower print head means to a temperature exceeding ambient;
(c) means for directing a high velocity air flow adjacent operative surfaces of said lower print head means; and
(d) control means for sequentially:

(1) actuating a condensation cycle wherein said droplet stream(s) are directed past said lower print head means with supplied ink at said nominal temperature and said lower print head means in a non-heated condition;

(2) actuating a drying cycle wherein high velocity air is directed past said lower print head means; and (3) actuating said second heating means wherein said lower print head means and said supplied ink are both at nominal temperatures.

11. In an ink printing apparatus of the type having an upper print head which directs ink droplet streams and a lower print head means for selectively charging such droplets as they pass thereby, an improved operational method for cleaning portions of said lower print head means, said method comprising:

(a) directing such droplet streams past said lower print head means;

(b) adjusting the relative temperature of said ink and said lower print head means to cause condensation of the ink solvent on the print head portions; and (c) directing drying air across such lower print head portions to dry those portions.

12. The method defined in claim 2 comprising subsequently heating said lower print head means to a temperature which prevents condensation of such ink solvent.

13. The invention defined in claim 10 wherein said ink is heated to effect such condensate forming temperature differential.

14. The invention defined in claim 10 wherein the condensing/drying sequence is repeated a plurality of times.

15. The invention defined in claim 14 wherein the lower print head means are heated after a plurality of condensing/drying sequences.

16. The invention defined in claim 10, 11, 12, 13, 14 or 15 wherein said lower print head means include drop catcher surfaces.

17. The invention defined in claim 10, 11, 12, 13, 14 or 15 wherein said droplet streams are directed in a non-stimulated condition during said condensing sequence.

18. The invention defined in claim 17 wherein control stimulation is applied to said droplet streams after a condensing/drying sequence(s).

19. Ink jet printing apparatus of the type having (i) an upper print head means for generating an ink droplet stream(s) from ink supplied thereto, (ii) a lower print head means, for influencing droplets passing thereby and (iii) means for supplying pressurized ink flow to said upper print head means, the improvement comprising:

(a) means for heating operative surfaces on said lower print head means;

(b) means for directing a drying air flow across operative surfaces of said lower print head means; and (c) control means for sequentially:

(1) actuating a condensation cycle wherein said droplet stream(s) are directed past said lower print head means with said print head means at a solvent condensing temperature;

(2) actuating a drying cycle wherein high velocity air is directed past said lower print head means; and (3) actuating said heating means to raise said lower print means above said condensing temperature.

* * * * *